US009321032B1

(12) United States Patent
Pollack et al.

(10) Patent No.: US 9,321,032 B1
(45) Date of Patent: Apr. 26, 2016

(54) INHERENTLY CONCRETE-COMPATIBLE CARBON SORBENTS FOR MERCURY REMOVAL FROM FLUE GAS

(75) Inventors: Nicholas R. Pollack, Moon, PA (US); Richard A. Hayden, Pittsburgh, PA (US)

(73) Assignee: Calgon Carbon Corporation, Pittsburgh, PA (US)

(*) Notice: Subject to any disclaimer, the term of this patent is extended or adjusted under 35 U.S.C. 154(b) by 351 days.

(21) Appl. No.: 12/481,819

(22) Filed: Jun. 10, 2009

Related U.S. Application Data (60) Provisional application No. 61/060,225, filed on Jun. 10, 2008, provisional application No. 61/073,112, filed on Jun. 17, 2008.

(51) Int. Cl.
| | |
|---|---|
| *C01B 31/00* | (2006.01) |
| *C04B 14/00* | (2006.01) |
| *B01J 20/28* | (2006.01) |
| *B01J 20/02* | (2006.01) |
| *C01B 31/06* | (2006.01) |
| *C01B 31/08* | (2006.01) |
| *B01J 20/20* | (2006.01) |
| *C04B 14/02* | (2006.01) |

(52) U.S. Cl.
CPC .......... *B01J 20/28085* (2013.01); *B01J 20/027* (2013.01); *B01J 20/20* (2013.01); *B01J 20/2808* (2013.01); *B01J 20/28011* (2013.01); *B01J 20/28061* (2013.01); *B01J 20/28064* (2013.01); *B01J 20/28066* (2013.01); *B01J 20/28071* (2013.01); *C01B 31/06* (2013.01); *C01B 31/08* (2013.01); *C04B 14/022* (2013.01)

(58) Field of Classification Search
USPC .......... 502/174, 180, 181, 400, 416, 418, 437
See application file for complete search history.

(56) References Cited

U.S. PATENT DOCUMENTS

| | | | |
|---|---|---|---|
| 4,453,978 A | 6/1984 | Okimura et al. | |
| 4,828,619 A | 5/1989 | Matsushita et al. | |
| 5,110,362 A | 5/1992 | Hoarty et al. | |
| 5,286,292 A | 2/1994 | Tsukada et al. | |
| 5,654,352 A | 8/1997 | MacDonald | |
| 2003/0206843 A1 | 11/2003 | Nelson, Jr. | |
| 2004/0069186 A1 | 4/2004 | Zacarias et al. | |
| 2004/0144287 A1 | 7/2004 | Tardif et al. | |
| 2004/0200389 A1 | 10/2004 | Young | |
| 2004/0206276 A1* | 10/2004 | Hill et al. | 106/708 |
| 2006/0204418 A1* | 9/2006 | Chao et al. | 423/210 |
| 2007/0056479 A1 | 3/2007 | Gray | |

FOREIGN PATENT DOCUMENTS

| | | | |
|---|---|---|---|
| CA | 2036746 A | | 2/1992 |
| WO | WO 2008/064360 | * | 5/2008 |

OTHER PUBLICATIONS

Pollack, Nicholas R., Ph.D., Sorbent Injection: Taking the Technology from R&D to Commercial Launch, Paper #188, Calgon Carbon Corporation, p. 1-24.
Sontheimer et al., Evaluation Methods Utilizing Aqueous Solutions, in Activated Carbon for Water Treatment, 1988, p. 100-103.
Dombrowski, Katherine, URS Corporation, Evaluation of Low-Ash Impact Sorbent Injection Technologies at a Texas Lignite/PRB Fired Power Plant.
Paradis, Jennifer, URS Corporation, Paper 164: Impact of Mercury Sorbents on Fly Ash Use for Cement Replacement.

\* cited by examiner

*Primary Examiner* — Elizabeth Wood
(74) *Attorney, Agent, or Firm* — Pepper Hamilton LLP (57) ABSTRACT

A sorbent composition and process of making sorbent designed for the removal of contaminants from flue gas and subsequent use in cement or concrete formulations are discussed. The sorbent composition comprises a coal feed stock prepared to have a total BET surface area of at least 350 m²/g, and wherein the sorbent has a cumulative surface area less than 10 m²/g for pore diameters between 0.01 and 0.1 microns, a cumulative pore volume less than 0.055 cc/g for pore diameters between 0.01 and 0.1 microns, or both.

11 Claims, 5 Drawing Sheets

INHERENTLY CONCRETE-COMPATIBLE CARBON SORBENTS FOR MERCURY REMOVAL FROM FLUE GAS

CROSS-REFERENCE TO RELATED APPLICATIONS

The present application claims priority to U.S. Provisional Patent Application No. 61/060,225 filed on Jun. 10, 2008; and U.S. Provisional Patent Application No. 61/073,112 filed on Jun. 17, 2008.

BACKGROUND OF THE INVENTION

The preferred method of removing mercury from coal-fired power plant flue gas streams is to inject a sorbent. The preferred sorbent is a porous carbonaceous char, typically an activated carbon. After the carbon is injected into the flue gas stream, it is captured by the particulate capture devices in the power plant and becomes part of the fly ash. Many utilities sell the ash to companies that service the cement and concrete industry which use the ash as a cement substitute. However, the presence of carbon in the fly ash can adversely affect the quality of cement and concrete that is made from fly ash since it tends to adsorb the foaming agent—commonly called an "AEA" or air-entrainment admixture—used in making the concrete. AEA's such as the vinsol resin MB-VR™, are used to create air voids in the concrete which make the concrete better able to contract and expand during freeze-thaw cycles. Without the air voids, the concrete is more likely to crack and spall. The problem, then, is that carbon, being a good sorbent, adsorbs and removes the foaming agent and thus tends to make the concrete more susceptible to cracking during freeze-thaw cycles. Sorbents other than carbon may be expected to produce similar outcomes. Excessive amounts of the foaming agent can be added to overcome this problem at the point of concrete manufacture, but the cost is often prohibitive and the testing the end-user must employ to determine the specific amount is time-consuming, ill-defined, and inconvenient. Where concrete-compatible carbons have been used in the prior art, they have either cost or supply limitations, such as Barnebey-Sutcliffe's type CA unimpregnated coconut or type CB (IAC) iodine-impregnated coconut, or they do not have sufficient mercury-removal capacity, such as RWE Rheinbraun's type HOK® lignite carbon.

To overcome this problem, a number of prior art solutions have been proposed, most of which depend upon post-treatment of the sorbent or the sorbent/fly ash by-product. Other art, such as that found in U.S. Pat. Nos. 4,453,978; 4,828,619; 5,110,362 and 5,654,352, has attempted unsuccessfully to resolve the problem by developing AEA's that are not adsorbed by the sorbent present in the fly ash. Still other art, particularly International Patent Application WO 2008/064360 A2 by Zhang et al., attempts to resolve the problem tautologically by identifying and selecting a concrete-compatible sorbent using a test, called the Acid Blue Index (ABI) (that serves merely as a surrogate for a test, called the Foam Index, long used for such purposes by the concrete industry), and calling the test a compositional parameter of the sorbent itself. Furthermore, Zhang et al. neither set nor claim boundaries for either the minimum level of surrogate test activity consistent with effective mercury removal or, indeed, the dimensional or compositional requirements of the sorbent for its primary function: the removal of mercury from the flue gas, a requirement that may conflict with the intended concrete-compatibility of the sorbent, producing sorbents with less than desirable commercial utility.

An example of sorbent post-treatment to resolve the problem may be found in U.S. Patent Application 20030206843/A1 by Nelson wherein a fly ash-friendly sorbent is made by oxidizing a carbonaceous sorbent with various chemicals, ozone in particular. A similar process has been proposed in U.S. Pat. No. 5,286,292 wherein the fly ash by-product itself is exposed to a halogen gas, preferably fluorine or chlorine, to neutralize the adsorption potential of the sorbent contained in the fly ash. However, such post-treatment processes are expensive, inconvenient, and often hazardous. Additionally, in the method of Nelson some surface oxygen groups may be stripped off at the high temperatures of the application, typically near or above 300F, rendering the treatment progressively ineffective during use. In U.S. Patent Application 20040069186/A1, P. S Zacarias and D. B. Oates propose oxidation of the fly ash by-product itself to gasify and remove any carbon that adsorbs or otherwise interferes with the AEA. Although directed primarily to sorptive carbon that entrains with the fly ash as part of the coal-burning process that produces the fly ash, the method could also be directed to fly ash by-products containing carbon sorbents added as mercury capture agents. In another variation of fly ash post-treatment, M. Tardiff, R. K. Majors, and R. L. Hill disclose in U.S. Patent Application 20040144287/A1 a process in which sacrificial agents, such as ethylene glycol phenyl ether and sodium di-isopropyl naphthalene sulfonate, are added to the fly ash to neutralize the adsorption of the AEA by sorptive carbons contained within the fly ash. A similar process is disclosed by R. D. Young in U.S. Patent Application 20040200389/A1. In U.S. Patent Applications 20070056479/A1 and 20070056481, L. J. Gray teaches the addition of a fluorochemical surfactant to the concrete during make-up that can preferentially stabilize the foam created by the AEA, even for fly ash containing up to 6% sorptive carbon as measured by loss on ignition (LOI), a measure of fly ash carbon content used customarily in the cement and concrete industries (ASTM C618-01). Once again, however, these post-treatment methods represent added cost and inconvenience. Other mercury sorbents, particularly those made from mineral materials, may be more fly ash-friendly, but lack the capability to efficiently remove mercury and other contaminants from the flue gas, making carbon-based sorbents by far the preferred sorbents for mercury capture and removal.

Therefore, it is an object of the present invention to provide a sorbent that efficiently and effectively removes mercury and/or other contaminants from flue gas streams while retaining the value of the fly ash for commercial cement and concrete applications. It is further the object of the present invention that both the contaminant adsorptive properties and concrete-compatible properties be provided as an integral and inherent feature of the sorbent's structure as manufactured, independent of any additional post-treatments or processes. Unlike the prior art, the present invention affords measurable upper and lower dimensions of pore surface areas, volumes, and diameters to provide optimal contaminant removal and concrete compatibility.

SUMMARY OF THE INVENTION

In various embodiments, the present invention is directed to a sorbent derived from a feed stock for removing mercury and other contaminants from flue gas without reducing the quality of the fly ash for subsequent concrete use. In an example the feed stock is a carbon, which is generally abundant and economical. During manufacture the pore size of porous regions of the feedstock are developed to be suitable for removal of mercury and other contaminants and to produce a sorbent that limits AEA adsorption. The sorbent is manufactured to achieve a total BET surface area of at least 350 m$^2$/g and to have a cumulative surface area less than 10 m$^2$/g for pore diameters between 0.01 and 0.1 microns and/or a cumulative pore volume less than 0.055 cc/g for pore diameters between 0.01 and 0.1 microns. The pore structure is tailored such that the adsorption properties become optimally and inherently favorable to mercury removal when exposed to flue gas, yet substantially and simultaneously unfavorable to the adsorption of AEA foaming agents when entrained in fly ash that is used subsequently for concrete manufacture. In examples, this sorbent can present a significant savings to the electric utility industry.

The interaction of the sorbent with the AEA during concrete manufacture is complex, involving a number of chemical and physical factors. Yet, the inventors have discovered the pore region critical to significant AEA transparency of the sorbent. Particularly a preferred carbon sorbent can be largely independent of the type of feedstock used to make the sorbent. In examples, it does not depend upon the total adsorption capacity of the sorbent. Unlike the teachings of Zhang et al., porous carbons made from even low-rank carbon feed stocks may now produce sorbents with both enhanced mercury removal and concrete-compatibility.

Surprisingly, the inventors discovered the most relevant dimensional and compositional characteristics for concrete-compatibility can be represented not by tests, such as BET surface area that measure total adsorption surface area, but by measurements of pore volumes and surface areas over a specific range of pore diameters. In particular, the inventors have discovered a critical porous region of the sorbent is where pore diameters range above about 0.002 microns (2 nm), and particularly above 0.01 microns (10 nm), but below pore diameters around 0.1 microns (100 nm). An advantage of the present sorbent and method is this region has both a lower and upper limit spanning both the mesoporous and macroporous regions of the pore space. It is itself the primary compositional metric for concrete-compatibility, while BET surface area serves as the primary compositional metric for mercury adsorption. Since it has been demonstrated in the present invention that BET surface area can range from around 350 m$^2$/g to well above 1000 m$^2$/g for a carbon sorbent having both effective mercury removal as well as concrete-compatibility, a discovery unknown in the prior art, a lower limit to BET surface area can suffice to ensure sufficient mercury removal capability. The inventors believe that one theory behind their discovery is the porous region critical to concrete-compatibility serves more of a kinetic than adsorptive function, thereby providing more time for the AEA to function as it should with the mineral components of the fly ash to entrain air during mixing, at which point the AEA becomes largely unavailable for adsorption into the carbon.

Mercury porosimetry is most often used to characterize and quantify the region not found to be critical to concrete-compatibility, although any comparable technique may also be used. In the present invention, this region has been correlated directly to a metric, called the foam test, long and widely used to distinguish concrete-compatible from concrete-incompatible carbon-containing flyash materials. The dimensions of the critical region of the carbon sorbent, as well as the foam test metric, have been found in this invention to correspond reasonably well to the Molasses Number for carbon-based sorbents, much as Iodine Number has been found to correspond to BET surface area by those skilled in the carbon arts. Therefore, in an example, the Molasses Number is useful to define an inherently concrete-compatible carbon sorbent provided a minimum BET surface area is also specified. Since the Iodine Number is known to those skilled in the activated carbon arts to numerically approximate BET surface area, the Iodine Number itself may be used to specify the requisite minimum total surface area. Generally speaking, the region of surface area or pore volume critically affecting the AEA transparency of the sorbent during concrete manufacture is small compared to the total surface area (as determined by BET surface area or as estimated by Iodine Number for carbon-based sorbents) or total pore volume (as determined by porosimetry for pore diameters above about 0.003 um) of the sorbent, typically 5% or less for the sorbents claimed in this invention.

In an example, the sorbent comprises an activated carbon made from bituminous coal having an Iodine Number of at least 300 mg/g. The sorbent is manufactured to remove mercury effectively absent any post-treatment of the carbon to improve its effectiveness. Anything below 300 mg/g may result in progressively reduced levels of mercury removal (N. Pollack and R. Vaughn, "Sorbent Injection: Taking the Technology from R&D to Commercial Launch," Paper #188, Power Plant Air Pollutant Control "Mega" Symposium, Aug. 25-28, 2008, Baltimore, Md., which is incorporated by reference herein). Since Iodine Number is known to those skilled in the activated carbon arts to approximate the total BET surface area of an activated carbon (H. Sontheimer, J. C. Crittenden, and R. S. Summers, "Activated Carbon for Water Treatment" Second Edition (DVGW-Forschungsstelle, 1988), p. 102, which is incorporated by reference herein), the minimum pore structure for mercury retention and AEA exclusion can, therefore, also be monitored by the development of surface area for a given carbon feedstock and a given set of process conditions. However the lower and upper limit to Iodine Number and, therefore, to total surface area, can change depending upon the feedstock and manufacturing process used to make the sorbent. For activated carbons derived from coconut, for example, Iodine Numbers above 1000 mg/g or BET surface areas above 1000 m$^2$/g can still produce concrete-compatible sorbents having considerable AEA transparency while for other sorbent starting materials, lignite in particular, increases in BET surface area can work quickly against development of concrete compatibility unless suitable modifications are made to the manufacturing process. However, coconut-based sorbents have much more limited availability and may give rise to critical supply interruptions, while lignite-based carbons rapidly lose concrete-compatibility as BET surface areas rise above about 300-350 m$^2$/g.

In various embodiments, this invention specifies the critical pore structure of the carbon such that the properties of the sorbent are optimized for adsorption of mercury and other contaminants from the flue gas, as well as transparency to the AEA during cement/concrete make-up and use, independent of the feedstock and process conditions used to make the sorbent and independent of any post-production modifications to improve the concrete-compatibility and mercury-removal capabilities of the sorbent. The invention thereby eliminates post-treatment costs and avoids the problems associated with the prior art by making the properties of the sorbent itself both highly effective for contaminant removal and inherently concrete-compatible and significantly transparent to the addition of foaming agents such as AEAs.

Those and other details, objects, and advantages of the present invention will become better understood or apparent from the following description and embodiments thereof.

BRIEF DESCRIPTION OF THE DETAILED DRAWINGS

The accompanying drawings illustrate examples of embodiments of the invention. In such drawings:

FIG. 1 shows

DETAILED DESCRIPTION OF EXAMPLES OF THE INVENTION

Various embodiments of the present invention are directed to inherently concrete-compatible sorbents. The sorbent, in various embodiments, is defined by its total surface area and cumulative surface area or pore volume. In such embodiments, the sorbent has a total BET surface area of at least 350 $m^2/g$, and either a cumulative surface area of less than 10 $m^2/g$ for pore diameters between 0.01 and 0.1 microns or a cumulative pore volume less than 0.055 cc/g for pore diameters between 0.01 and 0.1 microns. Alternatively, the sorbent has both a cumulative surface area of less than 10 $m^2/g$ and a cumulative pore volume less than 0.055 cc/g for pore diameters between 0.01 and 0.1 microns. Preparation of the sorbent requires careful control of the sorbent pore structure to produce an inherently concrete-compatible sorbent that is also effective for removal of mercury and other contaminants from the flue gas. The optimal pore structure is obtained when sufficient high-energy adsorption micro-pore volume is developed for effective mercury removal without the concurrent development of larger lower-energy pores conducive to AEA transport and adsorption. In an example, a preferred carbon sorbent can be prepared from a broad range of carbon feed stocks and processing conditions. The sorbent has a pore volume characterized by that which is generally achievable at a BET surface area or Iodine Number of at least 350 $m^2/g$ or 350 mg/g, respectively, and a cumulative surface area less than 10 $m^2/g$ and/or a cumulative pore volume less than 0.055 cc/g for pore diameters between 0.01 and 0.1 microns to restrict the development of the pore region conducive to AEA transport and adsorption.

The structural and dimensional boundaries specified for the sorbents of the present invention may also be referenced by other parameters and testing methods that frame the region of interest, such as a minimum and maximum pore adsorption potentials, surface areas, volumes, and/or diameters for mercury removal and AEA exclusion, respectively, as provided by other conventional tests for these parameters or by any other individual parameters or test procedures that can be functionally and directly related to the pore regions of interest.

Generally speaking, BET surface area and, therefore, mercury removal capabilities obtain more readily and more at the expense of concrete-compatibility for lower rank carbon feedstocks, such as lignite and sub-bituminous coal, than for higher rank feedstocks, such as bituminous and anthracite coals, or high-density cellulosic feed stocks such as coconut. The lower rank coals are, therefore, less forgiving in terms of process conditions, but still effective in producing inherently concrete-compatible sorbents that are also effective for the removal of mercury and other contaminants. Although feedstock pre-treatments and changes in processing conditions may greatly improve sorbent structural development outcomes in these materials, they also usually increase process complexity and product costs and may be less desirable in this regard.

In various embodiments, the sorbent of the present invention was prepared from a variety of carbon feed stocks under a variety of process conditions. All of the carbon chars were free of any post-activation treatments or additives that might alter the inherent physical and chemical properties of the sorbent, such as the addition of halogens to improve mercury removal capabilities or the addition of pore blocking agents such as surfactants or oxidation with oxygen or ozone to enhance concrete-compatibility, although the use of such additives or processes may be useful extensions of the present invention. Series A carbons were made from sub-bituminous coal; series B, from lignite; series C, from coconut char; series D, from semi-anthracite coal; and series E, from bituminous coal. The feed stocks for series A-D were activated in steam at various temperatures above 700 C without pulverization and re-agglomeration of the feed stock. The feed stock for series E was pulverized, re-agglomerated, and oxidized in air at temperatures between 100 and 450C before activation in steam at temperatures above 700 C. The carbons were then tested for their AEA foaming tendencies by use of a foam index test.

In these examples, the number of drops of a vinsol-resin-based AEA available from BASF called MB-VR™ was used to indicate the concrete compatibility of the carbon in a foaming test that has had broad acceptability within the concrete manufacturing industry. Other AEAs, such as BASF's Micro-Air® and MB AE 90™, may be used in place of MB-VR™. Although they produce different numerical results, the relative ranking of foaming tendencies among different carbon sorbents does not change significantly. In this particular test, 2.0 grams of each carbon, pulverized to at least 95%<325 mesh, was added to 30.0 grams of a Class C fly ash and mixed by swirling for about 20 seconds with 70.0 grams of de-ionized water in an 8 ounce wide-mouth glass jar. Next, four drops of the AEA, undiluted and as received from the manufacturer, was added, and the jar was capped and shaken vigorously for about 30 seconds. Upon opening the jar, the surface of the slurry was inspected for a foam layer extending across and completely covering the surface that was stable for at least a minute. If none was observed, the process of adding 4 drops of AEA and shaking for 30 seconds was repeated immediately until the desired stable foam endpoint is achieved. The total number of drops of AEA added to achieve the stable foam endpoint was reported as the foam index for the carbon sorbent tested. An endpoint less than about 30 drops in the above test generally indicates a carbon sorbent that is reasonably to marginally concrete-compatible, depending upon the type and quality of concrete desired. Twelve drops or less indicates a highly concrete-compatible carbon. Four drops or less—or the end-point of the fly ash alone containing no carbon—indicates a carbon that is essentially transparent to the AEA. Endpoints above about 40 drops usually indicate little commercial utility for a fly ash which contains the carbon at the level tested.

The results of the carbon foam indexes were compared to various carbon properties of each sorbent to determine if and how certain properties may be tailored to produce a carbon sorbent for mercury removal from flue gas that would also be concrete-compatible when entrained in the flue gas fly ash. The other carbon-related parameters determined for this purpose included pore volume and surface area as a function of pore size as determined by Mercury Porosimetry (Micromeritics Test Method 942/65000/03 or equivalent); Apparent Density ("AD", Calgon Carbon Test Method 1 or equivalent); Iodine Number (Calgon Carbon Test Method 4 or equivalent); and Molasses Number (Calgon Carbon Test Method 3 or equivalent). These data are given in Table 1. Based on the data generated from the examples, a dimensional window for concrete-compatibility was found that was largely and surprisingly independent of feed stock or processing conditions.

TABLE 1

| Carbon | AD (g/cc) | Iodine # ( g/g) | Molasses # | Foam Index (dropsMB-VR)™ | Pore Volume* (cc/g) | Pore Area** ($m^2$/g) |
|---|---|---|---|---|---|---|
| A1 | 0.619 | 314 | 123 | 12 | 0.031 | 4.170 |
| A2 | 0.568 | 523 | 133 | 28 | 0.052 | 7.550 |
| A3 | 0.479 | 701 | 204 | 90 | 0.093 | 14.741 |
| B1 | 0.689 | 235 | 118 | 18 | 0.025 | 3.727 |
| B2 | 0.638 | 308 | 136 | 32 | 0.046 | 6.871 |
| B3 | 0.541 | 414 | 183 | 76 | 0.097 | 15.016 |
| C1 | 0.488 | 912 | 123 | 12 | 0.025 | 3.714 |
| C2 | 0.432 | 1281 | 131 | 28 | 0.035 | 6.080 |
| C3 | 0.345 | 1476 | 153 | 60 | 0.066 | 13.519 |
| D1 | 0.701 | 649 | 133 | 28 | 0.040 | 8.243 |
| D2 | 0.612 | 831 | 147 | 52 | 0.057 | 11.997 |
| E1 | 0.703 | 601 | 133 | 8 | 0.023 | 3.286 |
| E2 | 0.598 | 928 | 138 | 28 | 0.033 | 4.953 |
| E3 | 0.506 | 1115 | 168 | 66 | 0.063 | 11.684 |

*cumulative pore volume for pore diameters between 0.01 and 0.1 um (10 to 100 nm)
**cumulative pore area for pore diameters between 0.01 and 0.1 um (10 to 100 nm)

In the examples to follow, Example 1 illustrates the insufficiency of common but yet measures of adsorption potential, such as Iodine Number, to define the composition of an effective mercury-removal sorbent that is also concrete-compatible. Although useful and necessary for indicating adequacy for mercury capture and the sorption of other potential contaminants, the microporous region of the sorbent bears surprisingly little relevance to the structural requirements for AEA exclusion. Example 2 shows how AEA exclusion is affected over a particular and critical range of pore diameters, pore surface areas, and pore volumes as measured by mercury porosimetry. Example 3 illustrates that Molasses Number can be a suitable indicator of AEA exclusion across a broad range of carbons made from different carbon feed stocks under different processing conditions, while Example 4 shows how the critical region of pore diameters, pore surface areas, and pore volumes is, in turn, reasonably related to Molasses Number. Taken together, these examples illustrate and define the compositional parameters for a sorbent that is suitable for the removal of mercury and other contaminants from flue gas, but also largely transparent to AEA addition when entrained in fly ash that is subsequently used for cement and concrete make-up.

EXAMPLE 1

Figure 1:
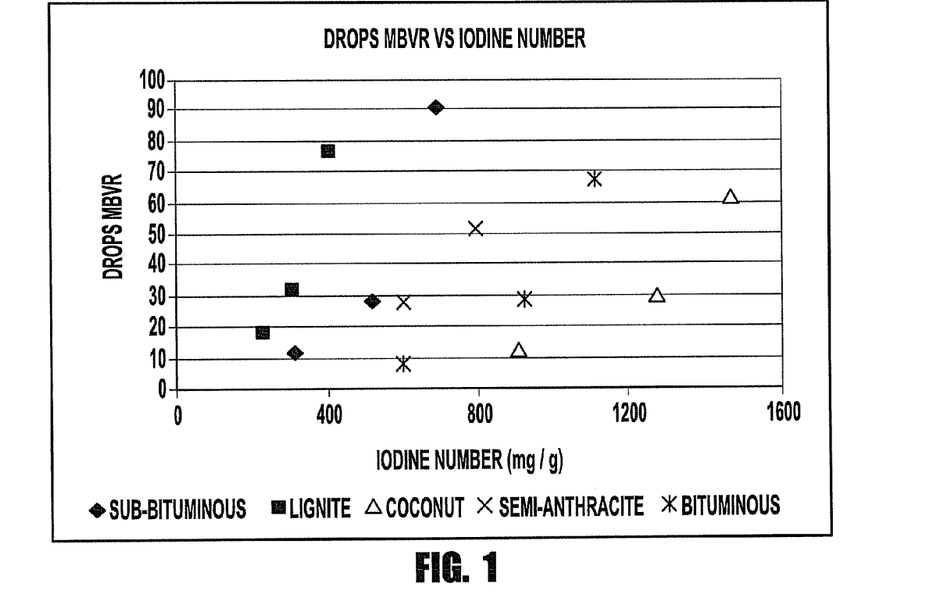
FIG. 1 shows the variation in Foam Index with Iodine Number for carbon sorbents made from a range of carbon feed stocks and process conditions.

In this example, the relationship between Iodine Number and the foaming tendencies (AEA exclusion) of the various carbon sorbents is shown in FIG. 1. Iodine Number is normally closely related to total BET adsorption surface area and adsorption pore volume. When compared to BET surface area, Iodine Numbers are usually within roughly 10% of the BET value (H. Sontheimer, J. C. Crittenden, and R. S. Summers, "Activated Carbon for Water Treatment" Second Edition (DVGW-Forschungsstelle, 1988), p. 102, which is incorporated by reference herein). As such, Iodine Number is generally a reasonable indicator of carbon sorbent performance in a given application. However, as shown in FIG. 1, it is clear that this parameter alone is insufficient to specify the composition of a concrete-compatible carbon sorbent independent of the material and process conditions used for its manufacture. For adequate mercury removal from flue gas some minimum Iodine Number or total surface area is generally necessary establishing a lower bound to surface area for a carbon sorbent that must also be concrete-compatible. A lower limit of about 350 mg/g (Iodine Number) or 350 $m^2$/g (BET surface area), or more preferably a lower limit of about 400 mg/g (Iodine Number) or 400 $m^2$/g (BET surface area) is selected for the preferred carbon-based sorbents (N. Pollack and R. Vaughn, "Sorbent Injection: Taking the Technology from R&D to Commercial Launch," Paper #188, Power Plant Air Pollutant Control "Mega" Symposium, Aug. 25-28, 2008, Baltimore, Md., vide supra).

EXAMPLE 2

Figure 2:
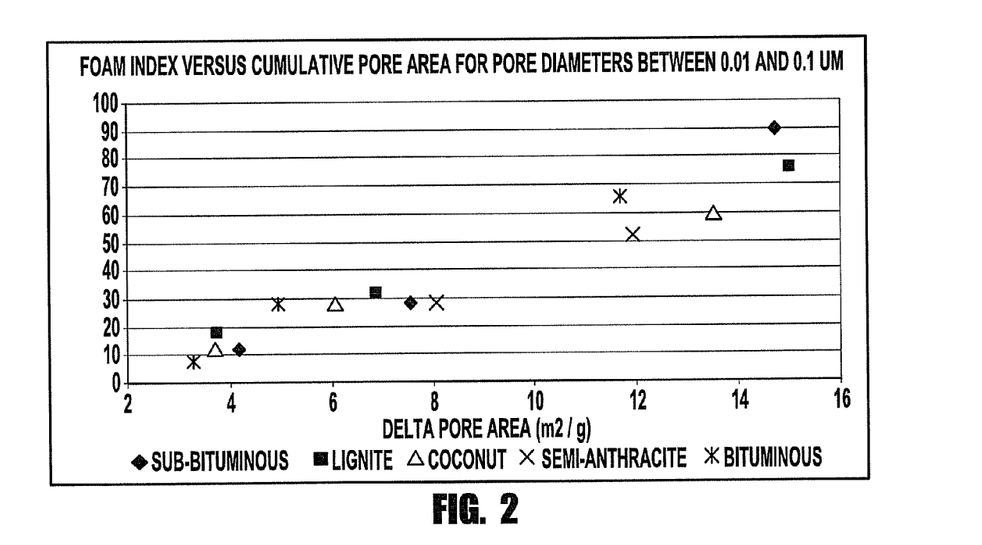
FIG. 2 shows the variation in Foam Index with Cumulative Pore Area for pore diameters between 0.01 and 0.1 um for carbon sorbents made from a range of carbon feed stocks and process conditions.
Figure 3:
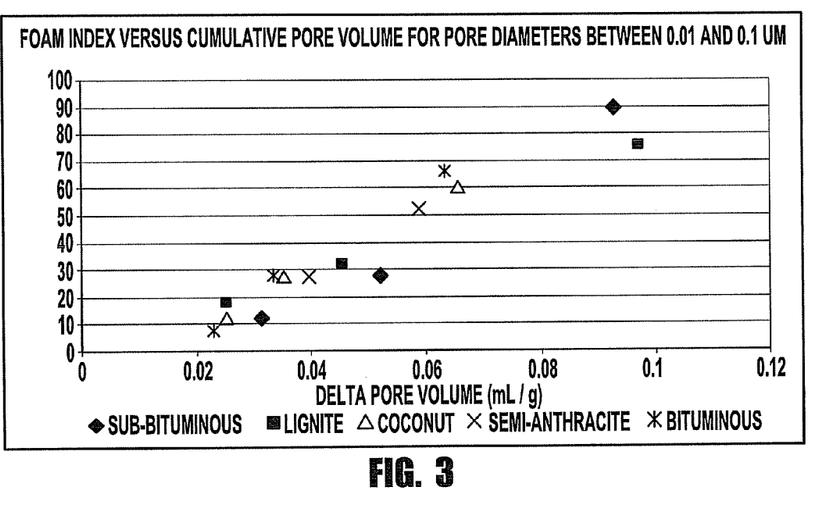
FIG. 3 shows the variation in Foam Index with Cumulative Pore Volume for pore diameters between 0.01 and 0.1 um for carbon sorbents made from a range of carbon feed stocks and process conditions.

In this example, a relationship is established between the foaming tendencies of the various carbons (AEA exclusion) and a particular region of the carbon pore structure above about 0.01 microns (10 nm) as determined, for example, by mercury porosimetry or comparable techniques. In mercury porosimetry, elemental mercury is forced into the pore structure of the carbon under pressure. Under low pressure, the largest pores are filled first since they offer the least resistance to the flow of mercury. As the pressure is increased, pores with progressively smaller diameters are filled. From the data obtained during a run, the pore diameters and the cumulative and differential pore volumes and surface areas may be calculated for pore diameters roughly 0.003 microns (3 nm) and larger. In this example, it is seen that the pore region most closely related to the foam index of the carbon sorbent lies more in the region dominated by transport meso- and macro-pores having diameters above about 0.01 microns (10 nm) but less than about 0.1 microns (100 nm), as shown by the strong correspondence between Foam Index and cumulative pore surface area (FIG. 2) or cumulative pore volume (FIG. 3) in this region.

Figure 4:
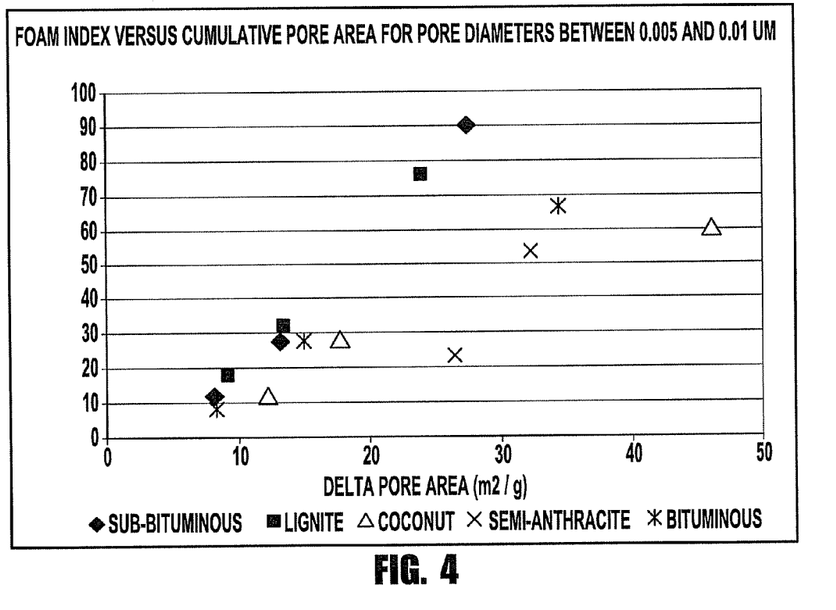
FIG. 4 shows the variation in Foam Index with Cumulative Pore Area for pore diameters between 0.005 and 0.01 um for carbon sorbents made from a range of carbon feed stocks and process conditions.
Figure 5:
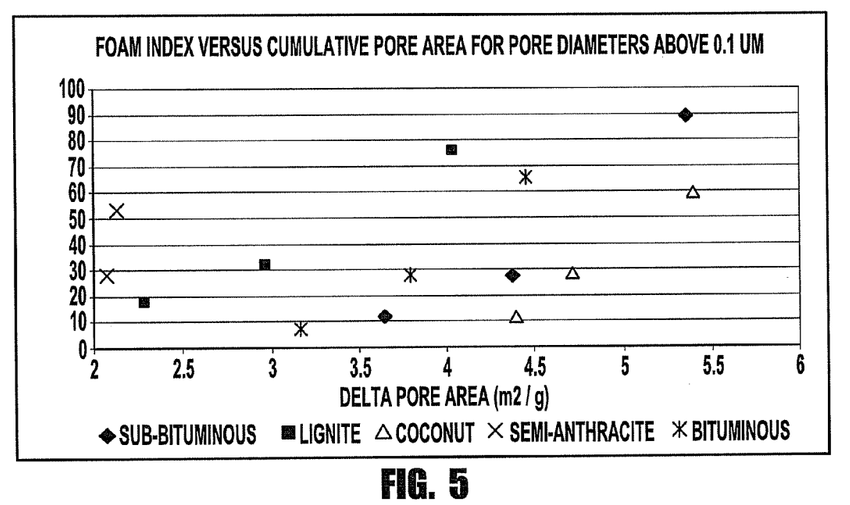
FIG. 5 shows the variation in Foam Index with Cumulative Pore Area for pore diameters above 0.1 um for carbon sorbents made from a range of carbon feed stocks and process conditions.
Figure 6:
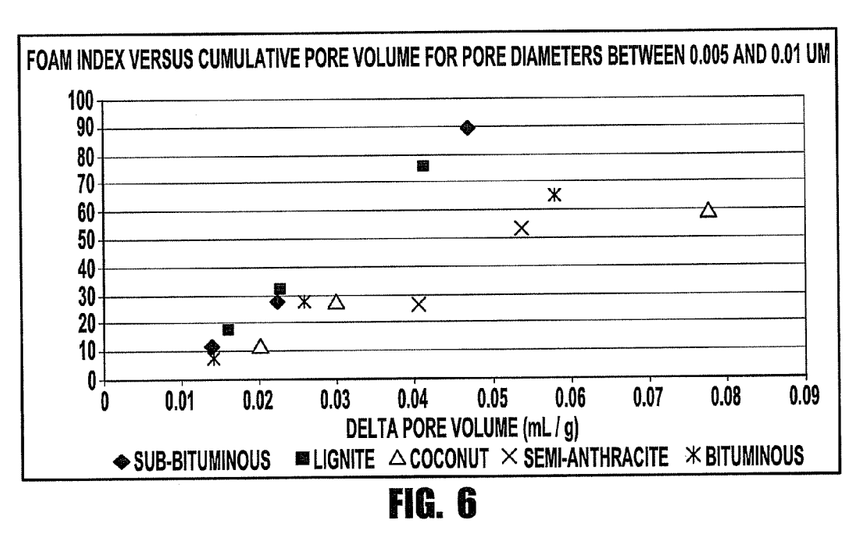
FIG. 6 shows the variation in Foam Index with Cumulative Pore Volume for pore diameters between 0.005 and 0.01 um for carbon sorbents made from a range of carbon feed stocks and process conditions.
Figure 7:
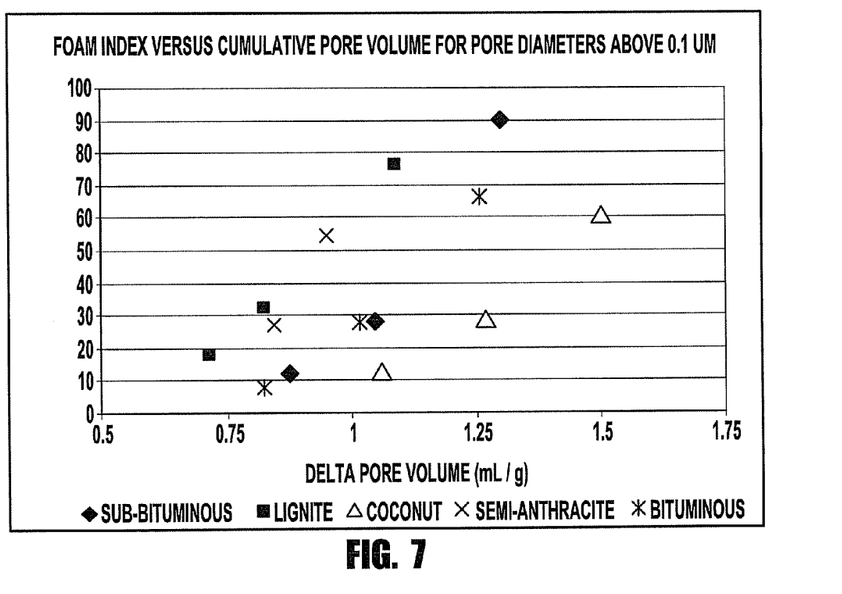
FIG. 7 shows the variation in Foam Index with Cumulative Pore Volume for pore diameters above 0.1 um for carbon sorbents made from a range of carbon feed stocks and process conditions.

Conversely, rather poor correspondence is observed for the region between 0.01 microns (10 nm) and 0.005 microns (5 nm) in pore diameter or for the region above a pore diameter of 0.1 microns (100 nm) as shown in FIGS. 4 and 5, respectively, for cumulative pore surface areas, or in FIGS. 6 and 7, respectively, for cumulative pore volumes in these regions. It should be noted that 0.002 microns (2 nm) is generally considered to be the upper limit of the adsorption micro-pore region by those skilled in the activated carbon adsorption arts.

EXAMPLE 3

Figure 8:
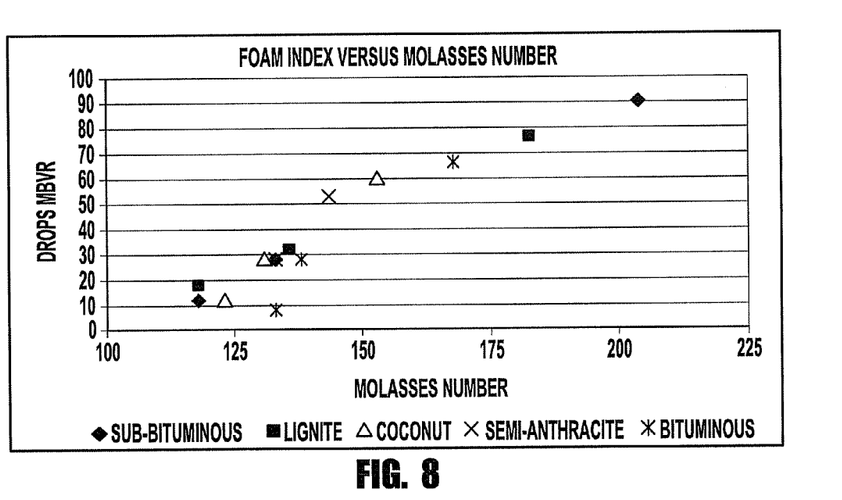
FIG. 8 shows the variation in Foam Index with Molasses Number for carbon sorbents made from a range of carbon feed stocks and process conditions.

In this example, the relationship between Molasses Number and foaming tendencies among the various carbon sorbents is shown in FIG. 8. Molasses Number is normally indicative of the pore volume of a carbon sorbent spanning the transition between larger diameter adsorption pores and the transport pores that lead to them. Historically, the test has had wide acceptance in the activated carbon arts, but chemical effects, such as pH, and other test variables may sometimes limit the applicability of the results from sorbent to sorbent. Surprisingly, for concrete-compatible applications, a relationship is seen between Molasses Number and the foaming tendencies of the sorbent that is largely independent of feedstock or manufacturing conditions, as shown in FIG. 8. Since the fly ash alone may produce a Foam Index of 4 to 8 drops of MB-VR™, a concrete-compatible carbon sorbent is defined as one with a foam index less than about 30 drops of MB-VR™. This would require a sorbent with a Molasses Number less than about 150, and preferably less than 140, by Calgon Carbon Test Method 3 or any Molasses Number derived from other versions of the Molasses Number test that can be correlated to the Molasses Numbers derived from Test Method 3.

EXAMPLE 4

Figure 9:
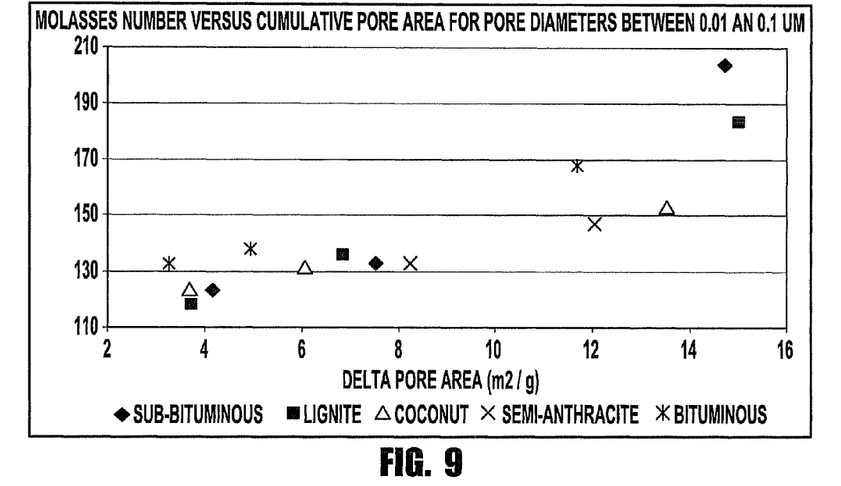
FIG. 9 shows the variation in Molasses Number with Cumulative Pore Area for pore diameters between 0.01 and 0.1 um for carbon sorbents made from a range of carbon feed stocks and process conditions.
Figure 10:
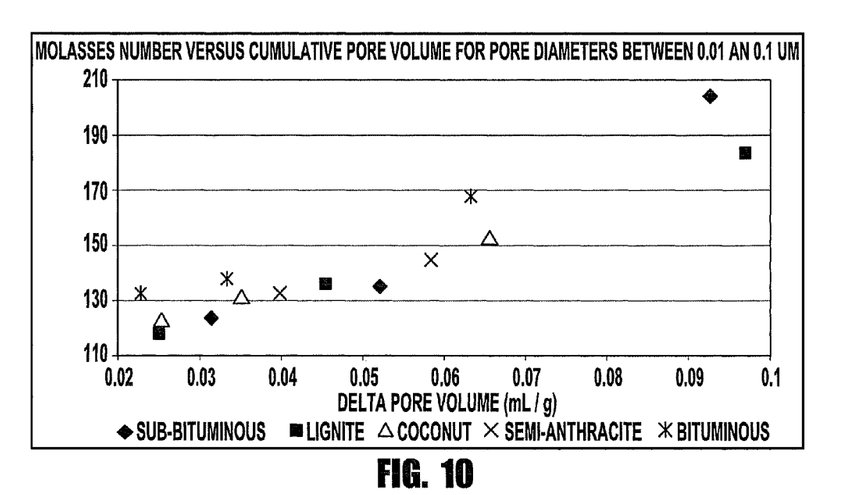
FIG. 10 shows the variation in Molasses Number with Cumulative Pore Volume for pore diameters between 0.01 and 0.1 um for carbon sorbents made from a range of carbon feed stocks and process conditions.

In this example a correspondence is established between Molasses Number as measured by Calgon Carbon Test Method 3 and Cumulative Pore Surface Area and Volume for Pore Diameters between 0.01 and 0.1 microns (10-100 nm). As shown in FIGS. 9 and 10, Molasses Number may also serve as a suitable parameter to specify the compositional parameters comprising an inherently concrete-compatible carbon sorbent for use in flue gas beneficiation, further confirming the claim boundaries established between Foam Index and Molasses Number given in Example 3. At a Molasses Number of around 150, the cumulative pore area in the region bounded by these pore diameters is less than about 10 $m^2/g$, while at a Molasses Number of around 140, the cumulative pore area is less than about 8 $m^2/g$. Similarly, at a Molasses Number of around 150, the cumulative pore volume in the same region of pore diameters is less than about 0.055 mL/g, while at a Molasses Number of around 140, the cumulative pore area is less than about 0.05 mL/g.

In other examples, the sorbent can have further additives, treatments or process which serve to further enhance the properties of mercury removal and/or contaminant removal from a flue gas stream and/or its utility for a subsequent cement or concrete formulation. For example the sorbent is a carbon char that further includes a halogen or halide to enhance mercury or other contaminant removal. Additionally or alternatively, the sorbent further includes a pore blocking agent to enhance concrete-compatibility. The pore blocking agent can include one or more surfactants or treatment with oxygen, halogens or ozone.

While the presently preferred embodiments of the invention have been shown and described, it is to be understood that the detailed embodiments are presented for elucidation and not limitation. The invention may be otherwise varied, modified, or changed within the scope of the invention as defined in the appended claims.

What is claimed is:

1. A flue gas sorbent comprising, a carbonaceous char having:
   a total BET surface area of at least 350 $m^2/g$; and
   a cumulative surface area less than 10 $m^2/g$ for pore diameters between 0.01 and 0.1 microns, a cumulative pore volume less than 0.055 cc/g for pore diameters between 0.01 and 0.1 microns, or a combination thereof;
   wherein the porous carbonaceous char does not significantly adsorb air entrainment admixture (AEA).

2. The sorbent of claim 1, wherein the carbonaceous char is activated carbon.

3. The sorbent of claim 1, wherein the total BET surface area is at least 400 $m^2/g$.

4. The sorbent of claim 1, wherein the cumulative surface area is less than 8 $m^2/g$ for pore diameters between 0.01 and 0.1 microns.

5. The sorbent of claim 1, wherein the carbonaceous char further comprises at least one halogen or halide.

6. The sorbent of claim 1, wherein the carbonaceous char further comprises at least one pore blocking agent.

7. The sorbent of claim 1, wherein the carbonaceous char further comprises at least one surfactant.

8. The sorbent of claim 1, wherein the carbonaceous char was treated with oxygen, halogens, or ozone.

9. The sorbent of claim 1, wherein the carbonaceous char is prepared from lignite coal, sub-bituminous coal, coconut, or cellulosic feedstock.

10. The sorbent of claim 1, wherein the carbonaceous char comprises a Molasses Number of less than 140.

11. A concrete comprising the sorbent of claim 1.

* * * * *